United States Patent
Ignasiak

Patent Number: 5,674,324
Date of Patent: Oct. 7, 1997

[54] METHOD FOR HIGHLY EFFICIENT HEATING SYSTEM OF HYDROCARBON CONTAMINATED SOILS AND EFFECTIVE REMOVAL OF VOLATILE HYDROCARBONS

[75] Inventor: Teresa Ignasiak, Edmonton, Canada

[73] Assignee: Envirotech Consulting Inc., Alberta, Canada

[21] Appl. No.: 378,241

[22] Filed: Jan. 24, 1995

Related U.S. Application Data

[63] Continuation of Ser. No. 65,489, May 24, 1993, abandoned.
[51] Int. Cl.$^6$ .................... B08B 3/00; B08B 3/06; B08B 3/10
[52] U.S. Cl. ............ 134/19; 134/25.1; 134/30; 134/32; 134/33; 134/34; 134/35; 134/10
[58] Field of Search ................ 134/10, 12, 19, 134/25.1, 30, 32, 33, 34, 35; 210/170, 77

[56] References Cited

U.S. PATENT DOCUMENTS 4,424,081  1/1984  Giguere ................ 134/10
5,019,245  5/1991  Ignasiak et al. ........ 134/25.1
5,172,709  12/1992 Eckhardt et al. ........ 134/95.1

*Primary Examiner*—Zeinab El-Arini

[57] ABSTRACT

An improved method for heating the aqueous slurries of soils contaminated with tarry/oily organics and volatile compounds. The method includes the steps of heating the slurry (containing inorganic and carbonaceous solids below ⅛ inch) with atmospheric pressure steam in a specially designed slurry heater(s), contacting the hot (95°–99° C.) slurry with the contaminated feed soil (top size 5 inch) in a hydraulic feeder, processing the resultant slurry in a tumbler at temperatures up to 90° C., separating the –⅛ inch solids from the slurry exiting the tumbler and recycling a portion of the –⅛ inch solids in slurry back to slurry heater(s). In order to reach the required temperature in the tumbler, the –⅛ inch slurry has to travel through the tumbler at mass flow rates 1.5–4.0 times higher as compared to those for the soil feed stream. Under such conditions, the fine (–⅛ inch) components of the soil are processed under more rigorous conditions (steam, high temperature, residence time, agitation) compared to large (⅛–5.0 inch) mineral components of the soil. This results in further improvement of thermal efficiency of the process.

3 Claims, 4 Drawing Sheets

Diagram of a tumbler/slurry heater system for direct steam heating of the recycle slurry, according to present invention.

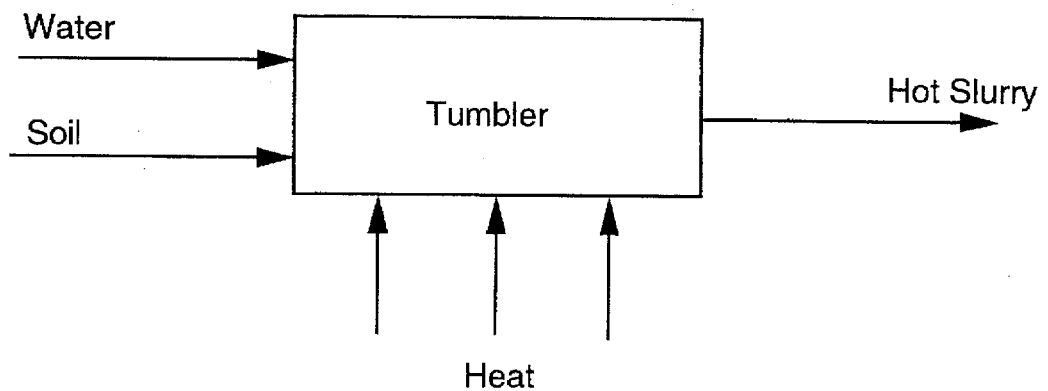
Fig. 1A. Indirect tumbler heating system.
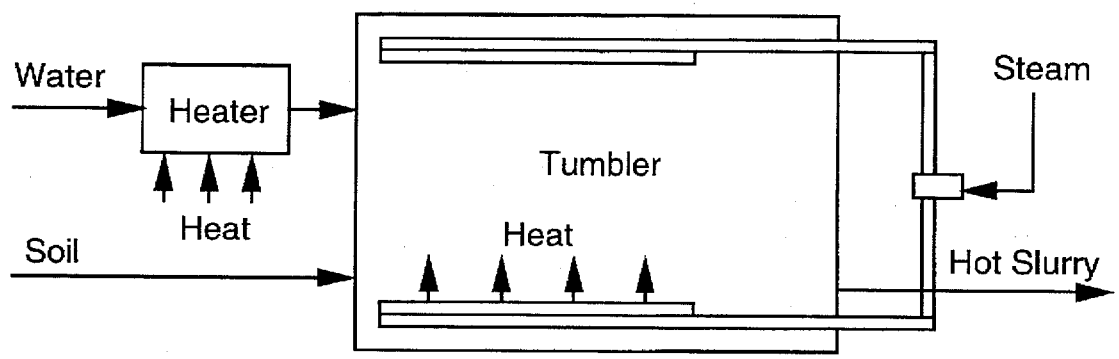
Fig. 1B. Combined indirect water heater and direct tumbler heating system with steam sparging.

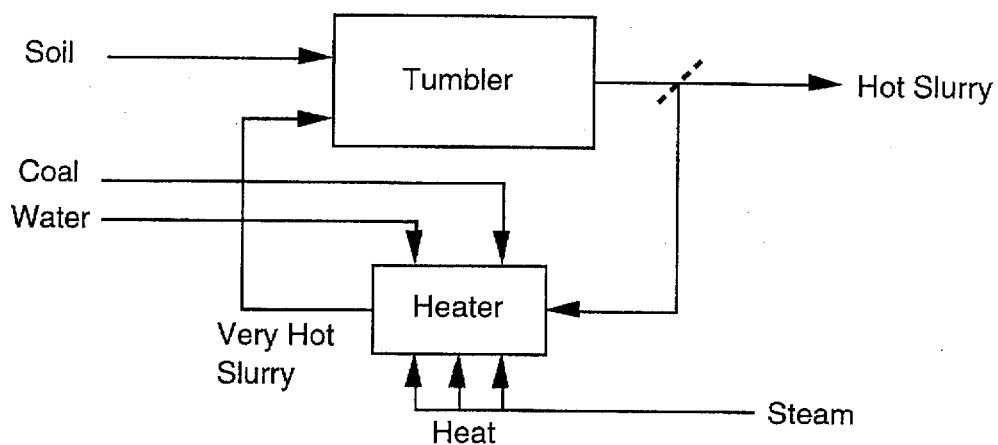
Fig. 1C. Steam heating of recycle slurry in a slurry heater according to present invention
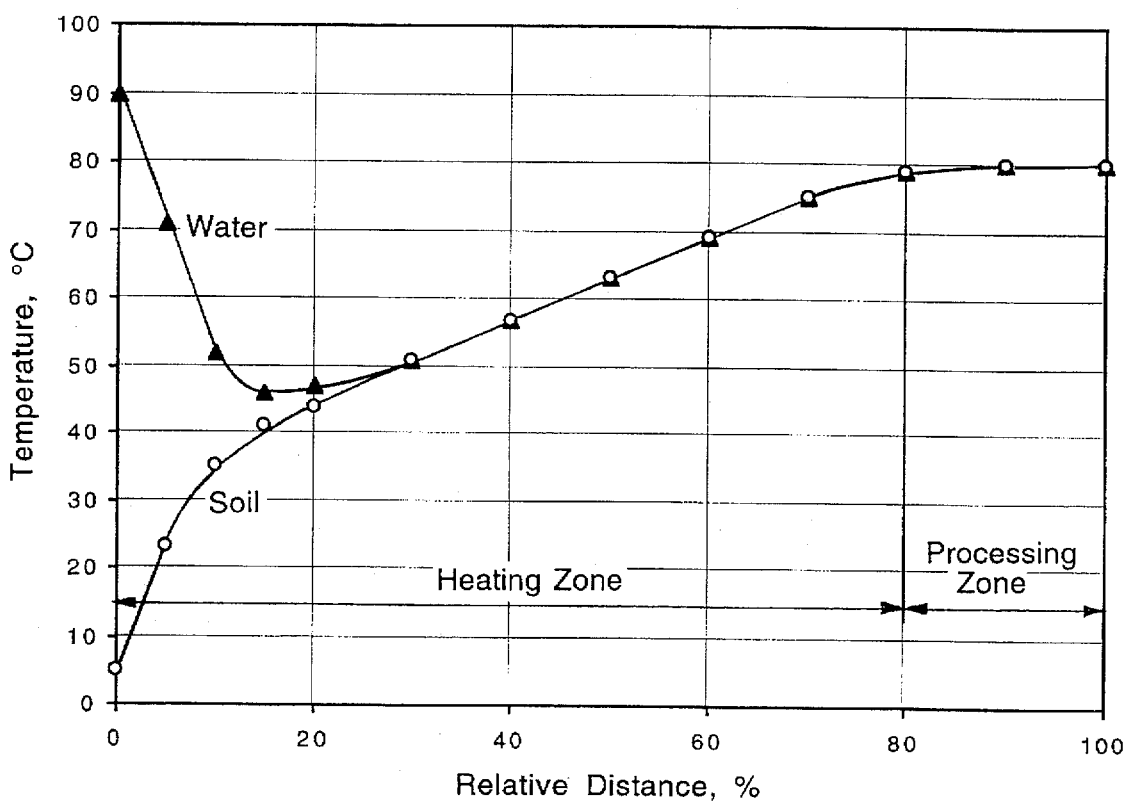
Fig. 2. Temperature distribution in a tumbler with a heating system as shown in Fig. 1B.

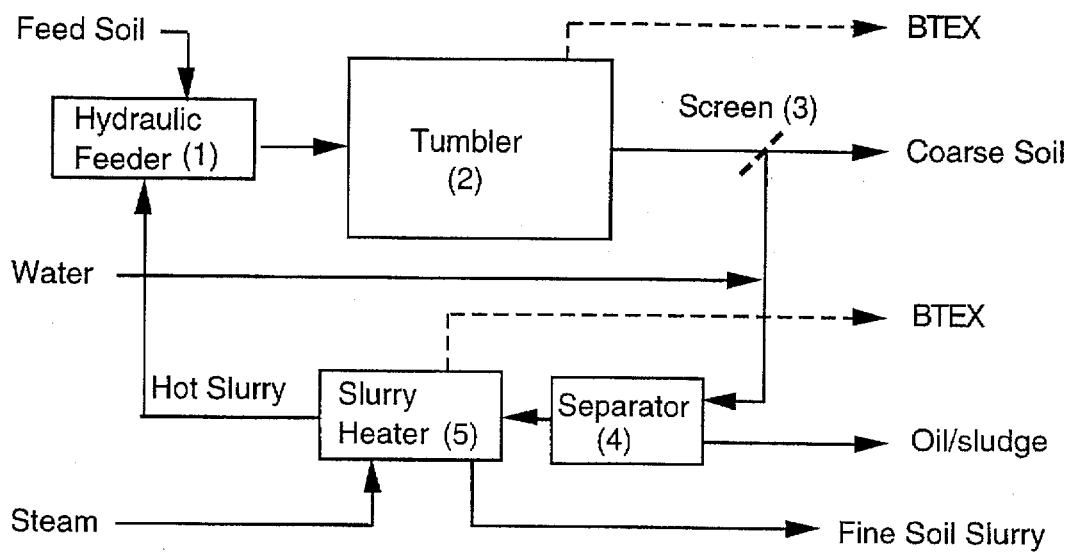
Fig. 3. Diagram of a tumbler/slurry heater system for direct steam heating of the recycle slurry, according to present invention.
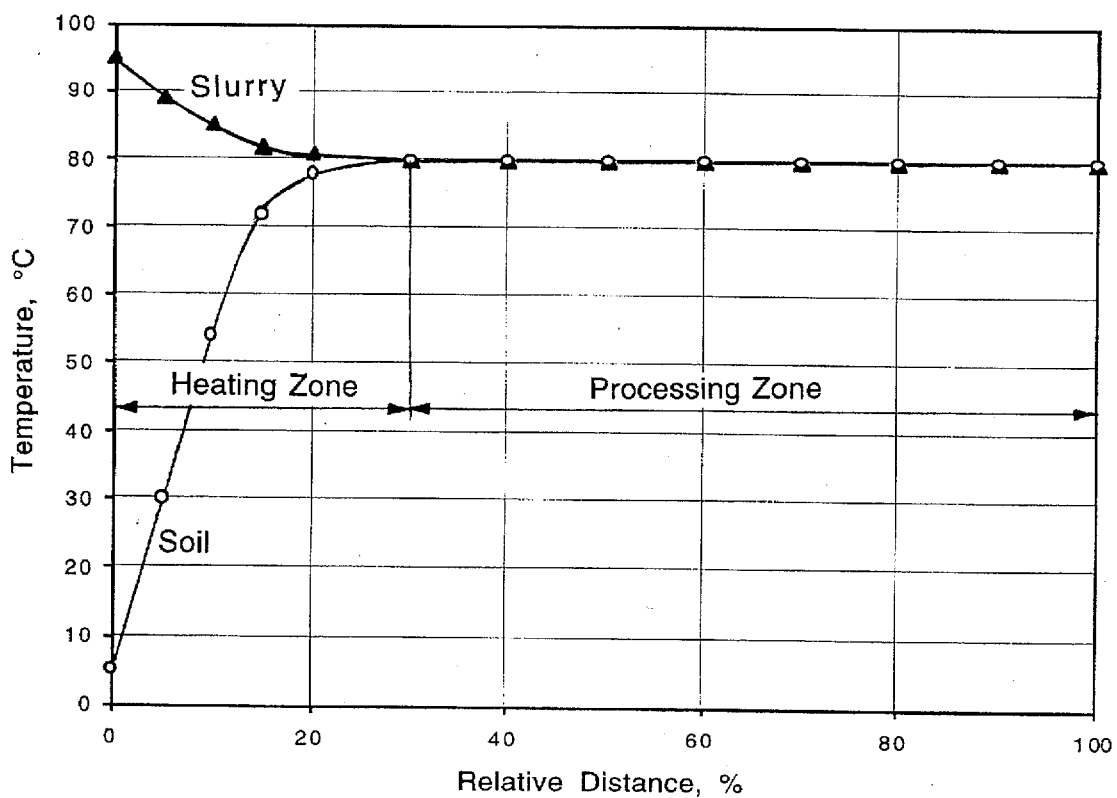
Fig. 4. Temperature distribution in a tumbler with a heating system designed according to present invention (see Fig. 3).

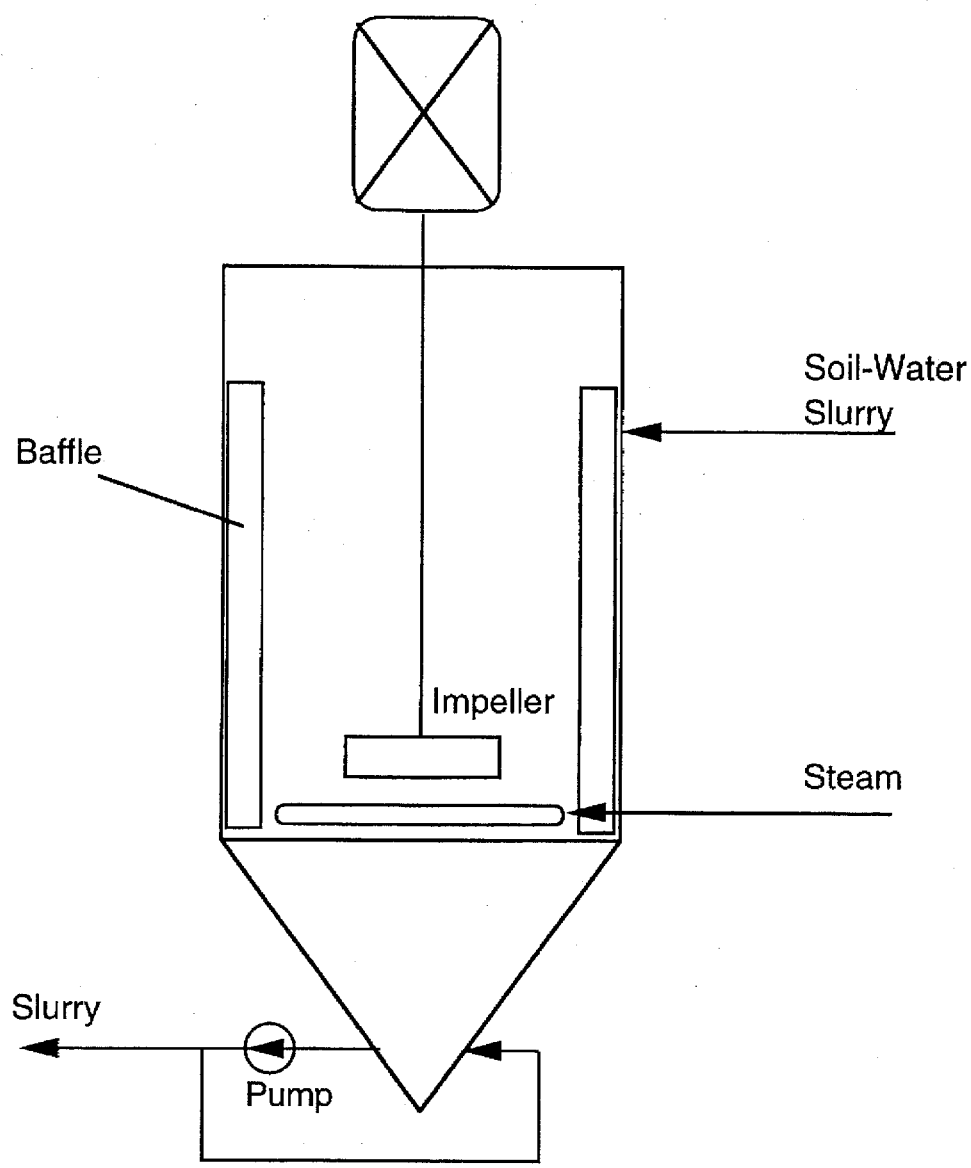
Fig. 5. Slurry heater for direct steam heating of the recycle slurry, according to present invention.

METHOD FOR HIGHLY EFFICIENT HEATING SYSTEM OF HYDROCARBON CONTAMINATED SOILS AND EFFECTIVE REMOVAL OF VOLATILE HYDROCARBONS

This is a continuation of application Ser. No. 08/065,489 filed May 24, 1993, now abandoned The present invention is directed to a method for highly efficient heating during processing of hydrocarbon contaminated soils and removal of volatile hydrocarbons from these soils.

BACKGROUND OF THE INVENTION

FIELD OF THE INVENTION

One of the most difficult problems in heavy oil/bitumen industry (1), as well as remediation of soils contaminated with hydrocarbons, when using washing techniques (2,3), is preparation of aqueous slurries of hydrocarbon contaminated soils and bringing the temperature of such slurries to a level required for subsequent separation of the hydrocarbon phase from the mineral (soil) components. The other difficulty associated with the slurryfication and heating process is a need to effectively remove from the slurry and collect all volatile hydrocarbons ($C_3$–$C_8$).

Prevention of release of light hydrocarbons to the atmosphere became of critical importance due to tightening the environmental regulations and laws. In the United States, the implementation of the Clean Air Act will probably result in the next few years in total ban on release of light hydrocarbons to the atmosphere.

DESCRIPTION OF THE PRIOR ART

One of the approaches in present bitumen/heavy oil industry practice is to heat the water used for soil slurryfication prior to introduction to a tumbler. The hot water and the soil are fed into the tumbler separately. The slurryfication takes place inside of the tumbler. In the tumbler the slurry is additionally heated by contacting with steam which brings the temperature of the slurry to a level required for further processing. No attention is given in this process to light hydrocarbons which, if present, are released to the atmosphere and lost. The steam heating system, which is similar to that used in commercially available roto-louvre heaters, is mechanically complex. The steam release jets are subject to considerable wear and plugging. Experience acquired by the heavy oil/bitumen industry shows, that most of the problems encountered during the tumbling process is associated either with steam switching mechanism or with damage of the steam distribution system in the tumbler.

Essentially each soil remediation technology, based on the washing techniques, applies tumbling as a first stage of treatment. The aqueous slurry containing hydrocarbon contaminated soil, is mixed and heated in the presence of reagents/adsorbers/surfactants, in order to reach the required temperature of treatment and clean the soil efficiently. Sometimes heat is applied to the tumbler indirectly. The efficiencies of heat utilization in the indirect heating system, are rather poor, but the mechanical reliability of this system is better as compared to that used in directly heated tumblers.

It is the object of the present invention to provide a method for effective heating and processing of hydrocarbon contaminated soils and any other reagents/adsorbers/surfactants as may be required in the process. The proposed method assures the highly efficient heat transfer and exceptional mechanical reliability of the system. In the system according to the present invention the residence times for coarse and fine particles are different. The hydrocarbon bearing fine soil fraction is processed 2 to 3 times longer due to recycling.

It is another object of the present invention to provide a system which will assure an effective separation and collection of volatile hydrocarbons evolved from the slurry.

Those and other objects of the present invention will be apparent from the following description of the preferred embodiment and the appended claims and from practice of the invention.

SUMMARY OF THE INVENTION

The present invention provides a highly efficient soil heating method, by assuring optimum heat transfer conditions of the aqueous slurry of hydrocarbon contaminated soil and any other admixtures (reagents/adsorbers/surfactants) that could be required in the next steps of the process, and for effective separation and collection of volatile hydrocarbons contained in the slurry; it comprises the steps of contacting the feed soil (freed of aggregates larger than 5 inches) with a jet of hot (~95°–99° C.) aqueous slurry containing mineral matter particles (below ⅛ inch) and small quantities of hydrocarbons, in a hydraulic feeder; tumbling the resulting slurry in a tumbler (residence time 3–15 min.); removing the volatilized hydrocarbons from the tumbler; classifying the +⅛ inch mineral components from the slurry by screening; directing the −⅛ inch slurry to a separator where the excess hydrocarbons and admixtures can be separated by flotation; heating the remaining portion of the −⅛ inch mineral matter loaden slurry in a separate slurry heater to 95°–99° C. by steam sparging; removing the residual quantities of steam distillable volatile hydrocarbons from the heater; contacting the hot (95°–99° C.) slurry exiting from the heater with fresh feed soil in the hydraulic feeder. To assure a highly efficient heat transfer and removal of volatile hydrocarbons, it is required in the present invention that the mass flow rate of the −⅛ recycled slurry is from 1.5–4 times higher as compared to mass flow rate of the feed soil stream.

BRIEF DESCRIPTION OF THE DRAWINGS

In the accompanying figures,

FIG. 1A presents a schematic drawing of a tumbler used by soil remediation industry for indirect heating and conditioning the aqueous slurry containing hydrocarbon contaminated soil and other admixtures;

FIG. 1B presents a schematic drawing of a tumbler equipped with a separate water heater and a direct steam sparging heating system; such heating arrangement is often used by heavy oil/bitumen or soil remediation industries for heating and conditioning the aqueous slurries containing hydrocarbon contaminated soils and other admixtures.

FIG. 1C presents, according to present invention, a schematic drawing of a tumbler equipped with a separate slurry heater; in such system the slurry exiting the tumbler is freed of large mineral matter particles (eg. +⅛inch) and recycled through slurry heater (where it is contacted with low pressure steam) back to the tumbler; the mass flow rate of slurry through the tumbler and the heater is much higher compared to the mass flow rate of the soil passing through the tumbler, so the processing temperature in the tumbler can readily reach 80° C.

FIG. 2 presents results of experimental measurements of temperature distribution profile in a conventional tumbler used by Canadian tar sands industry for heating and conditioning aqueous slurries of hydrocarbon contaminated soils and other admixtures (heating in the tumbler is based on a principle as shown in FIG. 1B).

FIG. 3 presents a diagram of a tumbler/slurry heater system for direct steam heating of the recycle slurry in order to bring the feed soil and other admixtures to the required processing temperature; separate a portion of the hydrocarbon components in a separator in the form of oil enriched sludge; quantitatively separate the BTEX-type volatile hydrocarbons in a slurry heater; separate a portion of fine (−⅛ inch) soil slurry and recycle the hot slurry as required by present invention.

FIG. 4 presents, according to present invention, and based on available experimental data, a temperature distribution in a tumbler with a separate heater for direct steam heating of the recycle slurry.

FIG. 5 presents, according to present invention, a schematic drawing of slurry heater for direct steam heating of the recycle slurry.

DESCRIPTION OF THE INVENTION

The process according to the present invention is directed to heating and conditioning of aqueous slurry of hydrocarbon contaminated soil and other reagents/adsorbers/surfactants that might be required in the subsequent steps of the process and efficient separation of volatile hydrocarbons from the slurry.

The hydrocarbon contaminated soil is comprised of a mixture of mineral matter components (sand, gravel, rocks, slag, clays) with a variety of hydrocarbons (petroleum type hydrocarbons; coal tar hydrocarbons; petrochemical products and byproducts; halogen, sulfur, nitrogen derivatives of the type of organic compounds identified above). The concentration of hydrocarbons can be as low as 0.2–0.5 w/w % up to 60–70 w/w %; the average hydrocarbon content is about 4–6 w/w %. The water content of the contaminated soil can vary from a few percent to about 30 w/w %.

To heat the soil and form the slurry, according to present invention, the hydrocarbon contaminated soil is screened at 5 inch. The +5 inch fraction is rejected and the −5 inch fraction is contacted in a hydraulic feeder with a jet of hot (95°–99° C.) slurry that disperses and flushes the feed soil into the tumbler. If required in the subsequent stages of the processing, appropriate reagents (for example: NaOH, $CaCO_3$), adsorbers (for example: activated carbon, coal, coke), surfactants (for example: oleic acid, sodium xanthate) can be also added to the hydraulic feeder. By adjustment of mass flow rates of the feed soil and hot slurry from the heater, the concentration of solids in the tumbler is maintained at a level of 50–60 w/w %. Revolving action of the tumbler creates an intimate mixing of the slurry; the mixing intensity can be enhanced by installation of lifters. Furthermore, the residence times of large mineral matter components (for instance over 1 inch size) can be controlled by installation of ring-type flow restrictors. Due to high dispersion of the soil (hydraulic feeder), agitation and intimate contact between the hot slurry and cold soil particles, the heat exchange surface is significantly increased and the heat exchange rate is extremely high. Heat losses associated with removal of uncondensed steam from the tumbler are minimized because steam is not delivered into the tumbler. The heating zone in a tumbler designed according to this invention is much shorter compared to conventional tumblers equipped with steam sparging systems widely used by heavy oil/bitumen processing industry. Therefore, the ratio of the heating zone to processing zone in tumblers designed according to present invention is significantly lower as compared to conventional industrial tumblers. For a required processing time (lets say 10 minutes) and at a specified temperature, the length of a tumbler designed according to present invention, will be significantly shorter as compared to conventional tumbler. The temperature profile for the tumbler built according to present invention will be significantly more uniform compared to that typical of conventional tumbler. Good dispersion, high temperature and agitation enhance the release and removal of volatile hydrocarbons from the slurry.

The slurry exiting the tumbler is screened at 1/40–⅛ inch. Depending on residence times in the tumbler and other conditions of processing (temperature, presence of reagents, adsorbers, surfactants) the coarse mineral matter separated (usually +⅛ inch) is, after washing (e.g. with hot make-up water), essentially free of hydrocarbons and can be safely disposed of. The residual slurry containing the mineral matter (usually −⅛ inch), non-volatile hydrocarbons, residual quantities of volatile hydrocarbons, reagents, adsorbers and surfactants is directed to heater system. If required, this system can be equipped with flotation based separation unit, which will separate a significant portion of hydrocarbon-rich fraction and, independently some of the −⅛ inch mineral matter from the residual slurry. The said residual slurry is contacted in a slurry heater with low pressure steam under such conditions that the heat of steam condensation is quantitatively utilized for bringing the temperature of the residual slurry to 95°–99° C. An alternate option is to heat the whole slurry in slurry heater, where the residual quantities of volatile hydrocarbons are separated and subsequently pass the heated slurry through hydrocyclone for separation of some of the −⅛ inch solids from the slurry.

The slurry heater design is based on direct heat exchange between the slurry and low-pressure steam. An arrangement of steam sparging nozzles has been developed in such a way as to prevent solid build-up and plugging the nozzles. Any damage to the nozzles is significantly reduced due to absence of large mineral matter particles (rocks, pebbles) in the slurry. The slurry heater is equipped with a discharge pump built into a recycling loop to facilitate a quick system start-up and prevent plugging. Proper introduction of the slurry into the slurry heater and application of agitation, provide the conditions required for effective heat transfer from the steam to slurry.

The hot slurry is pumped from heat exchanger into the hydraulic feeder and utilized for dispersing, transporting and heating the hydrocarbon contaminated feed soil.

In order to meet the heat balance requirements for the tumbler/slurry heatersystem, the slurry has to travel through the tumbler at mass flow rates 1.5–4 times higher as compared to those for the feed soil stream, in order to reach the 80° C. (in most cases) tumbler processing temperature. Contacting the recirculated slurry with steam in the slurry heater, according to present invention, optimal conditions for effective removal of volatile hydrocarbons from the slurry. The residence time in the heater required to heat the slurry from ~70° C. to 95°–99° C. is about 3 min. (usually from 1–5 min.).

The process for highly efficient heating of hydrocarbon contaminated soils and admixtures and for effective separation of volatile hydrocarbons, as described in the present invention, is designed to make considerable improvements as compared to methods of the prior art. The new invention offers the advantages of significantly more compact and reliable system as compared to conventional tumblers, under conditions of the same throughput. The new invention also offers simplicity and mechanical reliability in conjunction with great potential for energy savings. The new invention completely resolves the problem of effective separation of volatile hydrocarbons (additional separation of hydrocarbons from the fines which are characterized by much stronger hydrocarbon adsorption capacity) in the slurry heater at 95°–99° C., and resolves the problem of air-tightness at the tumbler inlet (hydraulic feeder). Furthermore, the new invention offers an opportunity to treat the fines under much more vigorous conditions (temp. 95°–99° C., contact with steam) compared to large (+⅛ inch) mineral matter particles which have low affinity to hydrocarbons and can be very well cleaned under much milder conditions (~80° C., water).

Finally, the system, as disclosed in the present invention, allows for treating the fines at longer residence times compared to readily cleanable coarse solids.

Having described the foregoing advantages of the present invention, the following examples are provided by way of illustration, but not by limitation.

EXAMPLE I

FIG. 2 presents the results of experimental measurements of temperature distribution in a conventional tumbler as applied by the tar sands processing industry (~10% hydrocarbon deposited on sand). The tar sand is fed into the tumbler together with small quantities of water (~25% water based on feed tar sand) and the slurry is heated by steaming through internal steam sparging system. In such a system the slurry travels about 80% of total tumbler length prior to reaching the processing temperature of 80° C. The average concentration of sand in the exiting slurry is about 50%.

FIG. 4 presents the results of experimental measurements of temperature distribution in a tumbler-heater system, as described in present invention, where the heating is carried out by supplying sufficient amount of hot (95–°99° C.) slurry containing –⅛ inch mineral matter particles. Under such heat transfer conditions, the slurry travels only about 25% of total tumbler length prior to reaching the processing temperature of 80° C. The average concentration of sand in the slurry is about 50%. It, therefor appears, that in tumbler/slurry heater system, as described in present invention, the tumbler's length can be shorten by 50%, compared to conventional tumbler processing tar sands, but it will do the same job (identical residence time at processing temperature of 80° C.).

EXAMPLE II

A sample of tar sands (containing about 10% hydrocarbons deposited on the sand) was spiked with a mixture of volatile hydrocarbons, namely benzene, toluene and m-xylene bringing the total concentration of benzene, toluene and m-xylene in this sample to 1,500 ppm based on total sample weight.

An aliquot of 100 g was taken from the spiked sample, placed in a 500 ml Erlenmayer flask (equipped with a glass joint) to which 100 ml of distilled water was added to form 50% tar sand slurry in water. The flask was placed in a fume hood and its contents were stirred and heated using electric plate until the temperature reached 80° C. At this temperature the agitation continued for additional 10 minutes. The resultant slurry was cooled to room temperature and the contents were extracted with 25 ml of methylene dichloride. The extraction was repeated 3 times; each time a fresh 25 ml portion of methylene dichloride was used. The whole volume of recovered methylene dichloride was combined (about 100 ml), dried with a dessicant, and analyzed by GC for benzene, toluene and m-xylene. The combined concentration of these hydrocarbons identified in the methylene dichloride extract was about 560 ppm (based on the tar sand sample used in this experiment).

Subsequent experiment was carried out in an identical way except that after 10 min. of agitating the sample at 80° C., the stirrer was removed from Erlenmayer flask and steam was passed (using steam sparger) through the contents of the flask for a period of time required to bring its contents to boiling. Three minutes after reaching the boiling temperature the steam sparger was removed from the flask, the contents were cooled and extracted, using the methylene dichloride, under exactly the same conditions as described above. The whole volume of recovered methylene dichloride was combined (about 100 ml), dried with a dessicant, and analyzed by GC for benzene, toluene and m-xylene. The combined concentration of these three hydrocarbons identified in the methylene dichloride extract was 0.6 ppm thus showing essentially quantitative removal of benzene, toluene and m-xylene.

In conclusion, based on examples I and II, the process of the invention provides conditions for extremely efficient (Example I) heat transfer and allows (Example II) for quantitative (over 99.99 %) removal of volatile hydrocarbons from processed slurry.

What is claimed is:

1. A method of heating hydrocarbon contaminated soils and removal of volatile hydrocarbons from aqueous slurries generated from said hydrocarbon contaminated soils, the method comprising the steps a/ contacting in a hydraulic feeder the hydrocarbon contaminated soils freed of aggregates larger than, for instance, 5 inches, with a jet (or jets) of heated aqueous slurry that is free of volatile hydrocarbons to form a primary slurry containing about 50–60% by weight of solids;

b/ tumbling said primary slurry in a tumbler to heat-up the hydrocarbon contaminated soils to a required temperature of up to 90° C., at a residence time not exceeding 15 min.;

c/ removing the volatile hydrocarbons that were desorbed from the hydrocarbon contaminated soils during tumbling said primary slurry by continuously drawing out from the tumbler the volatile hydrocarbons using, for instance, a fan having speed from about 100 to about 300 rpm connected to the tumbler;

d/ separating said primary slurry exiting the tumbler by passing it through a screen with openings not larger than ⅛ inch and not smaller than 1/40 inch into a hot oversize solids stream and a hot residual slurry stream;

e/ splitting said hot residual slurry stream using, for instance, a splitter into a first residual slurry substream accounting for 25–70% by volume of the hot residual slurry stream and a second residual slurry substream accounting for a balance of 75–30% by volume of the hot residual slurry steam;

f/ adding to the said second residual slurry substream a volume of water equivalent to that removed with the first residual slurry substream to form an aqueous slurry;

g/ heating said aqueous slurry containing from 1–50% by weight of hydrocarbons, mineral and non-mineral particles, where a concentration of hydrocarbons can vary from 0.1–30% by weight and mineral and non-mineral particles from 0.9–49.9% by weight and a size of the particles is below ⅛ inch to a temperature of up to 99° C. in a slurry heater equipped with an agitator having speed from about 10 to about 300 rpm and a steam sparging system discharging low pressure steam at pressures up to 1 atm.; removing the volatile hydrocarbons that were desorbed during agitation and steam heating by continuously drawing out from the slurry heater the volatile hydrocarbons; using, for instance, a fan having speed from about 100 to about 3000 rpm connected to the slurry heater to form the heated aqueous slurry that is free of volatile hydrocarbons;

h/ directing said heated aqueous slurry that is free of volatile hydrocarbons into the hydraulic feeder and contacting this slurry with hydrocarbon contaminated soils as described in step a;

i/ recycling the heated aqueous slurry through the hydraulic feeder, tumbler and slurry heater at mass flow rates from 1.5 to 4.0 times as high as the mass flow rates for hydrocarbon contaminated soils to heat-up said hydrocarbon contaminated soils to temperatures of up to 90° C.

2. A method according to claim 1 where in step e a hydrocyclone is used, instead of a splitter, for splitting the hot residual slurry stream into two substreams.

3. A method according to claim 1 where in step g two or more slurry heaters are used, instead of a single slurry heater, for heating aqueous slurry.

* * * * *